United States Patent
Granata

(10) Patent No.: US 6,729,032 B2
(45) Date of Patent: May 4, 2004

(54) CHASSIS MEASURING APPARATUS AND METHOD OF MEASURING A CHASSIS

(75) Inventor: Tebaldo Granata, Treglio (IT)

(73) Assignee: Snap-On Equipment GmbH, Pfungstadt (DE)

( * ) Notice: Subject to any disclaimer, the term of this patent is extended or adjusted under 35 U.S.C. 154(b) by 0 days.

(21) Appl. No.: 09/851,293

(22) Filed: May 8, 2001

(65) Prior Publication Data

US 2001/0052174 A1 Dec. 20, 2001

(30) Foreign Application Priority Data

May 9, 2000 (DE) .......................................... 100 22 534

(51) Int. Cl.$^7$ ................................................. G01B 5/24
(52) U.S. Cl. ........................ 33/193; 33/203.18; 33/600
(58) Field of Search ............................. 33/193, 203.12, 33/203.15, 203.18, 600, 613, 645, 288

(56) References Cited

U.S. PATENT DOCUMENTS

| | | | | | |
|---|---|---|---|---|---|
| 3,891,108 | A | * | 6/1975 | Traficant | 254/45 |
| 3,991,857 | A | * | 11/1976 | Wolk et al. | 187/269 |
| 4,447,042 | A | * | 5/1984 | Masui | 254/90 |
| 4,539,758 | A | * | 9/1985 | Riutta | 33/288 |
| 4,691,443 | A | * | 9/1987 | Hamilton et al. | 33/288 |
| 4,724,930 | A | * | 2/1988 | VanLierop | 187/204 |
| 5,031,726 | A | * | 7/1991 | Wakamiya | 187/204 |
| 5,054,207 | A | * | 10/1991 | Marshall | 33/203.12 |
| 5,058,286 | A | * | 10/1991 | Chisum | 33/288 |
| 5,111,585 | A | * | 5/1992 | Kawashima et al. | 33/203.12 |
| 5,207,001 | A | * | 5/1993 | Rossato | 33/203.12 |
| 5,341,575 | A | * | 8/1994 | Chisum | 33/288 |
| 5,386,639 | A | * | 2/1995 | Colarelli et al. | 33/193 |
| 5,675,515 | A | | 10/1997 | January | |
| 5,781,286 | A | * | 7/1998 | Knestel | 33/203.18 |
| 5,930,881 | A | * | 8/1999 | Naruse et al. | 33/203.12 |
| 6,115,927 | A | * | 9/2000 | Hendrix | 33/288 |
| 6,256,894 | B1 | * | 7/2001 | Naruse et al. | 33/203.12 |
| 6,257,371 | B1 | * | 7/2001 | Wanner | 187/215 |
| 6,341,013 | B1 | * | 1/2002 | Battiti et al. | 33/203.18 |

FOREIGN PATENT DOCUMENTS

| | | |
|---|---|---|
| DE | 32 10318 | 9/1983 |
| EP | 0816 801 | 1/1998 |
| WO | WO 9903018 | 1/1999 |

OTHER PUBLICATIONS

Nußbaum Automotive Lift product brochure, Title: UniLift 3500, Date: Jul. 7, 1997, Relevant pp. 1–2.

Mondolfo Ferro S.P.A. Product Brochure (Text in Italian with English translation), Title: Titan X433, Date: 1994, Relevant pp. 1–2.

Omer product brochure, Title: A Star is Born—The UTCA Lift, Relevant pp. 1–6.

Hofmann product literature, Title: The UTAC Lift Dealer Price List, Date: Jan. 31, 1984, Relevant p. 1.

John Bean Co. product literature, V3D Image Wheel Aligner, Date: 1998, Relevant p. 2.

* cited by examiner

*Primary Examiner*—Diego Gutierrez
*Assistant Examiner*—Madeline Gonzalez
(74) *Attorney, Agent, or Firm*—Davidson Berquist Klima & Jackson LLP

(57) ABSTRACT

The invention concerns an apparatus and a method for the chassis measurement of vehicles such as motor vehicles, wherein the apparatus includes a vehicle lift platform with which a chassis to be measured can be reversibly lifted and an axle measurement lifting device with which an axle measuring unit can be reversibly lifted. The axle measurement lifting device has at least two lifting stages which are actuable reversibly independently of each other.

16 Claims, 3 Drawing Sheets

CHASSIS MEASURING APPARATUS AND METHOD OF MEASURING A CHASSIS

FIELD OF THE INVENTION

The present invention concerns a chassis measuring apparatus for vehicles such as for motor vehicles, and a method of chassis measurement for vehicles.

BACKGROUND OF THE INVENTION

For reasons of travel safety of a vehicle and in order to avoid excessive wear at the wheels of the vehicle, checking the correct alignment of each wheel is an important procedure. That is effected by a process involving axle measurement. Axle measurement is effected both in the manufacturing plant where a vehicle is produced and also in workshops which are specifically equipped for that purpose.

In practice, inter alia optical methods have been employed for chassis axle measurement, which involves detecting accurate alignment or non-alignment of the wheel by means of a camera and by means of reflectors which are fitted to the wheels. If misalignment of the wheel or wheels is detected, then the vehicle is lifted by means of a lift platform on to which the vehicle is driven before the measuring operation is carried out. Adjustment is then effected, the vehicle is lowered and the settings made are checked. If it is found that the adjustment has not been correctly carried out, the vehicle has to be lifted once again for a further adjustment operation. That procedure therefore takes up a great deal of time and is accordingly cost-intensive.

In addition, the chassis-checking procedure or chassis adjustment in the vehicle manufacturing plant involves the problem that the individual checking and setting operations have to be carried out in rapid succession, corresponding to the large number of items being produced. In the case of the chassis measuring apparatuses which are involved in a practical context however, the vehicle can be driven on to the vehicle lift platform only from one end thereof, because the axle measuring device is stationarily arranged at the other end. That means that the next vehicle to be checked has to wait until the vehicle which is just being measured has actually left the vehicle lift platform. That means that the chassis measuring procedure takes up a disproportionately great amount of time, which increases manufacturing costs.

SUMMARY OF THE INVENTION

An object of the present invention is to provide an apparatus for vehicle chassis measurement, which permits rapid adjustment of the chassis of the vehicle while at the same time checking the adjustment procedure.

Another object of the present invention is to provide a method of measuring a vehicle chassis, which entails a rapid operating procedure that is easy to implement, combined with the possibility of accurate results.

The foregoing and other objects is attained by the invention set forth herein.

Designing the axle measurement lifting device with two lifting stages which are actuable reversibly independently of each other affords the possibility of using the one lifting stage, the first lifting stage, to adjust the axle measuring unit of the axle measurement device at the vertical height which is required for the measuring procedure. If in particular the axle measuring unit involves an optical measuring device, then vertical adjustment of the axle measuring unit is effected in accordance with the position of the associated reflectors at the wheels. If, after a defect in alignment of the individual wheels has been detected, a setting operation is required, then the vehicle can be lifted with the vehicle lift platform. In that situation, at the same time and by way of the second lifting stage of the axle measurement lifting device, the axle measuring unit which is set in respect of its vertical height in relation to the reflectors at the wheels of the vehicle is also lifted without in that situation the vertical adjustment thereof being altered. That means that time-consuming re-adjustment of the axle measuring unit is not required. Furthermore, there is the possibility of simultaneously effecting the setting operation while the measurement procedure is continuing so that the setting operation can be directly monitored and possibly altered once again.

In principle, there is the possibility of firstly raising the vehicle lift platform, detecting the vertical position thereof, and then vertically displacing the second lifting stage of the axle measurement lifting device in a controlled manner to the level of the vehicle lift platform. That involves a certain time delay as firstly the vehicle lift platform is raised, the position thereof is detected and then the second lifting stage of the axle measurement lifting device is raised. In order to be able to implement the setting operation in such a fashion as to save time, it is advantageous and a preferred feature of the invention if the lifting drive of the vehicle lift platform and the lifting drive of the second lifting stage of the axle measurement lifting device are actuable in such a way that they are displaceable synchronously. That provides that the vehicle lifting platform and the second lifting stage of the axle measurement lifting device are raised at the same time so that the setting operation can be effected immediately after the desired height of the vehicle lift platform has been reached.

In order to be able to flexibly displace the first lifting stage on the one hand and the second lifting stage and the vehicle lift platform on the other hand, a further preferred feature of the invention provides that the drive of the first lifting stage of the axle measurement lifting device is reversibly actuable independently of the drive of the second lifting stage and the vehicle lift platform.

Depending on the respective factors involved, quite different drives can be adopted for the vehicle lift platform and the lifting stages of the axle measurement lifting device. In accordance with another preferred feature of the invention a particularly inexpensive option for a drive provides that the vehicle lift platform and at least the second lifting stage of the axle measurement lifting device each have at least one respective piston-cylinder unit as the drive. The piston-cylinder units can be operated pneumatically or hydraulically.

In order to be able to implement the above-mentioned synchronous raising operation between the second lifting stage of the axle measurement lifting device and the vehicle lift platform, it is advantageous if the piston-cylinder unit of the vehicle lift platform is connected in series with the piston-cylinder unit of the second lifting stage of the axle measurement lifting device, for synchronous raising movement to the same heightwise level.

The drive of the second lifting stage of the axle measurement lifting device can also be formed by at least one piston-cylinder unit.

Different design configurations which are also adapted to the factors involved can be adopted for the construction of the vehicle lift platform and the first and/or second lifting stage. It has been found to be particularly advantageous if the vehicle lift platform and/or the first lifting stage and/or the second lifting stage of the axle measurement lifting device are in the form of a scissor platform.

In general, the axle measuring device is arranged stationarily in front of the nose or the tail of the vehicle. The consequence of this arrangement, when the axle measuring device stands upright, is that the vehicle cannot move on to the vehicle lift platform and off again in one direction of movement, as the axle measuring device is in the way. That is a disadvantage in particular if the chassis measuring apparatus is used in a vehicle manufacturing plant in which the vehicles have to be checked in rapid succession. In order in this case also to be able to measure and possibly re-adjust as many chassis of vehicles as possible, with the apparatus according to the invention, in the shortest possible time, it is advantageous if the vehicle lift platform and the axle measurement lifting device are arranged on a common foundation provided with at least one recess for the axle measurement lifting device, into which it can be lowered, in its inoperative condition, to such an extent that it is aligned at least with the upper level of the trackway surface of the vehicle lift platform in the lowered condition. That affords the possibility that the vehicle on the vehicle lift platform can drive off the vehicle lift platform over the axle measuring device.

In order in that case to avoid damage to the axle measuring device, it can further be provided that the top of the axle measuring device is provided with a plate which at least approximately closes off the recess in the foundation.

Further objects, features and advantages of the invention will be apparent from the description hereinafter of a preferred embodiment.

DESCRIPTION OF THE PREFERRED EMBODIMENT

It will firstly be noted that terms such as 'top', 'bottom', 'left' and 'right' used in this respect in connection with the description relate to the drawings when viewed with the references and legends in such a position that they can be read in the normal fashion.

Figure 1:
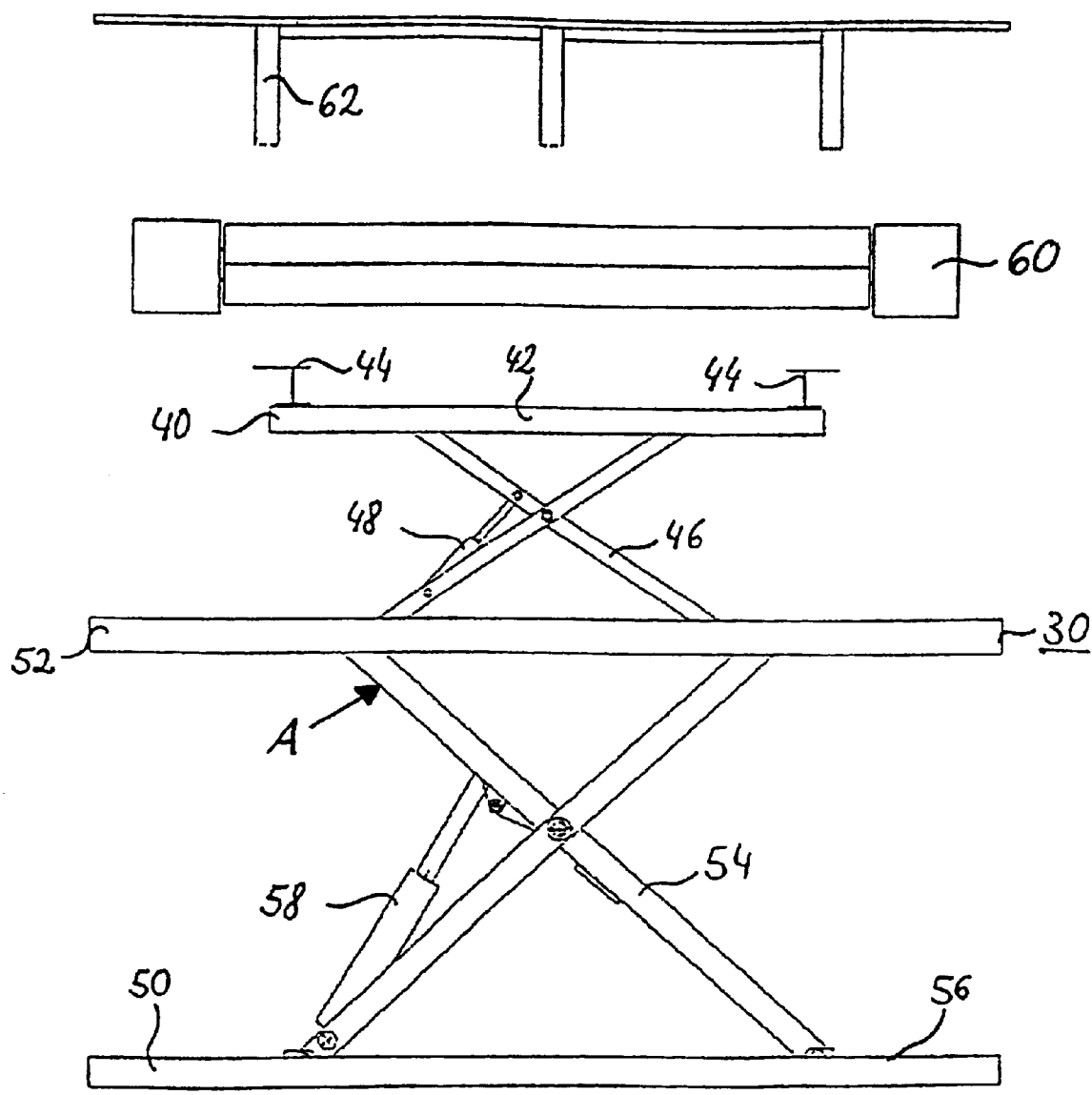
FIG. 1 shows an exploded view from the front of an axle measurement lifting device of a chassis measuring apparatus with two lifting stages according to the invention.
Figure 2:
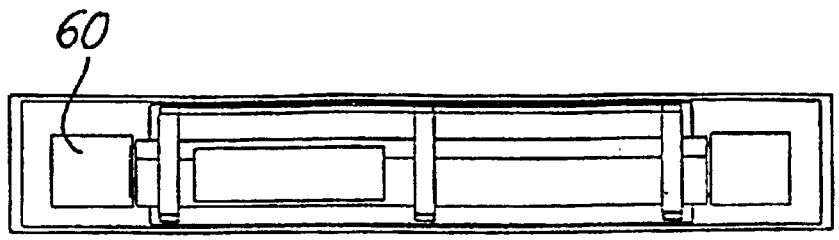
FIG. 2 is a plan view of the device shown in FIG. 1.
Figure 3:
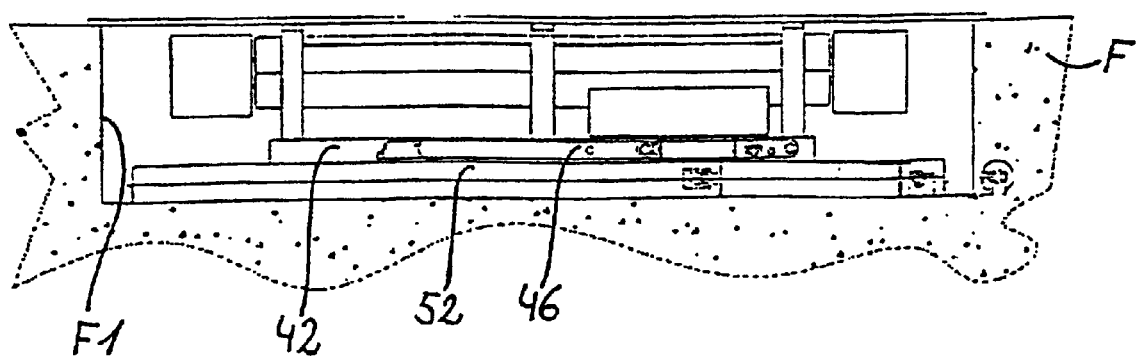
FIG. 3 is a sectional view of the measuring apparatus shown in FIG. 1, in the inoperative condition in which it is received in a recess in a foundation for the apparatus according to the invention.
Figure 4:
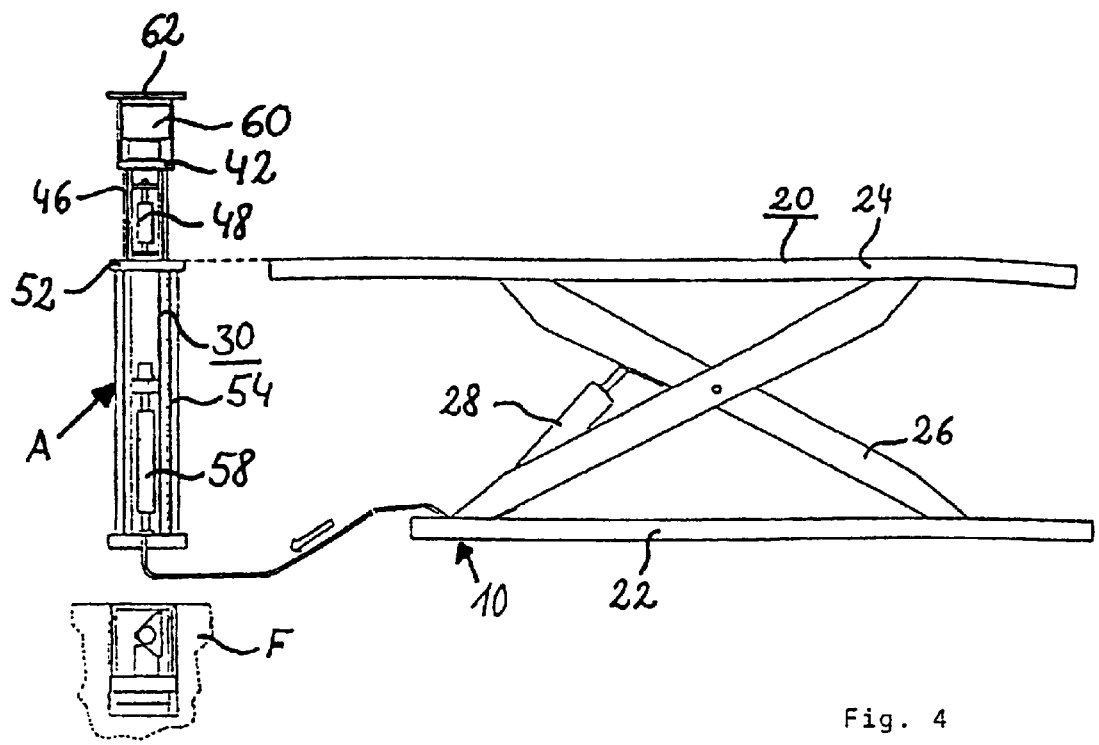
FIG. 4 is a side view of the chassis measuring apparatus according to the invention.

Referring to FIGS. 1 and 4, as can be seen therefrom the chassis measuring apparatus 10 according to the invention comprises as main structural groups thereof a vehicle lift platform 20 for raising and lowering a vehicle (not shown) to be examined, and an axle measurement lifting device 30. The vehicle lift platform 20 and the axle measurement lifting device 30 are arranged on a common foundation identified at F in FIG. 3. The foundation F can be a plate which is assembled to the main structural groups 20, 30 prior to their being set up and which is preferably made from steel. When the chassis measuring apparatus 10 is set in position, the plate can be fitted on the support floor. Alternatively, the foundation F can be a plate which is arranged in the support floor separately from the main structural groups prior to fitting thereof, and in particular can be in the form of a concrete plate. The illustrated embodiment implements the second alternative referred to above for the foundation F.

The vehicle lift platform 20 which can be seen in FIG. 4 is in the form of a scissor-type lift platform. It has a bottom plate 22 which can be fitted on the foundation F and which can be secured in position there by means of suitable elements and which extends substantially horizontally, and a drive-on arrangement 24, which also extends horizontally, for the vehicle which is to be examined to be driven on to the lift platform 20. The drive-on arrangement 24 can either be a continuous plate or it can be in the form of two mutually spaced rails or tracks which extend parallel to each other. The spacing of the two rails or tracks and the width thereof are so selected that different vehicles to be examined, involving different wheel spacings on each axle, can be driven thereonto. Preferably the rails or tracks are in the form of upwardly open U-shaped members whose width is markedly greater than the width of a vehicle tire. The rails can possibly be adjustable relative to each other in terms of their horizontal spacing.

The bottom plate 22 and the drive-on arrangement 24 are connected together by way of a scissor assembly 26 comprising centrally crossing arms. Depending on the conditions of use involved, the apparatus configuration may have a single pair of arms which are arranged centrally with respect to the bottom plate 22 and the drive-on arrangement 24, or it may have two pairs of arms which are mounted to the edges of the bottom plate 22 and the drive-on arrangement 24. The scissor assembly 26 is displaceable by means of a lifting device shown in the form of at least one hydraulic piston-cylinder unit 28 between a raised position as shown in FIG. 4 and a lowered position which is not shown. In the lowered position the drive-on arrangement 24 is substantially on the bottom plate 22 or is at only a small spacing in relation thereto.

The axle measurement lifting device 30 is provided at the left-hand end of the vehicle lift platform 20. The axle measurement lifting device 30 includes as essential component groups thereof a first lifting stage 40 and a second lifting stage 50 which, together with an axle measuring unit 60 which is preferably an optical measuring unit, form the axle measuring device indicated at A. As can be seen in particular from FIG. 1 the first lifting stage 40 and the second lifting stage 50 are also in the form of scissor-type lifting stages.

The first lifting stage 40 has a first support beam or bar 42 which extends horizontally and transversely with respect to the longitudinal extent of the vehicle lift platform 20. Provided upon the ends of the support bar 42 are fixing devices 44 for mounting the axle measuring unit 60. The axle measuring unit 60 is fitted on to the fixing devices 44 and secured by suitable fixing means, such as for example screws.

The first lifting stage 40 also includes a first scissor assembly 46 comprising centrally crossing arms. Depending on the respective conditions of use involved, the first scissor assembly 46 may have one or two pairs of arms. The support beam 42 is mounted to the upper ends of the arms of the scissor assembly 46 whereas the lower ends of the arms are mounted pivotably to a second support beam or bar 52 of the second lifting stage 50. The first lifting stage 40 is movable by means of a drive shown in the form of a first pneumatic piston-cylinder unit 48 between a raised position shown in FIG. 1 and a lowered position which is shown in FIG. 3 and in which the first support beam 42 of the first lifting stage 40 rests in plane-parallel relationship on the second support beam 52 of the second lifting stage 50 or is at an only small spacing in relation thereto.

The second lifting stage 50 includes the above-mentioned second support beam 52 which extends horizontally and transversely with respect to the longitudinal extent of the vehicle lift platform 20 and on which the first lifting stage 40 is arranged. The second lifting stage 50 also includes a second scissor assembly 54 which again is formed from one or two pairs of centrally crossing arms. The upper ends of the arms of the second scissor assembly 52 are pivotably connected to the second support beam 52 and the lower ends of the arms are pivotably connected to a base plate 56 which can be mounted on the foundation F. The second lifting stage 50 is displaced by means of a drive shown as a second pneumatic piston-cylinder unit 58 between a raised position which is shown in FIG. 1 and a lowered position which is shown in FIG. 3.

FIG. 3 shows the axle measurement lifting device 30 in a lowered position in which it is completely received in a recess F1 in the foundation F. In that way the vehicle to be examined can be driven off the vehicle lift platform 20 over the axle measurement lifting device 30. In order in that situation to avoid damage to the axle measurement lifting device 30, it is further provided with a cover plate indicated at 62 in FIG. 1 which covers over the recess F1 in the foundation F and protects the axle measurement lifting device 30 from damage caused by the vehicle as it is driven off or possibly also driven on to the platform.

Figure 5:
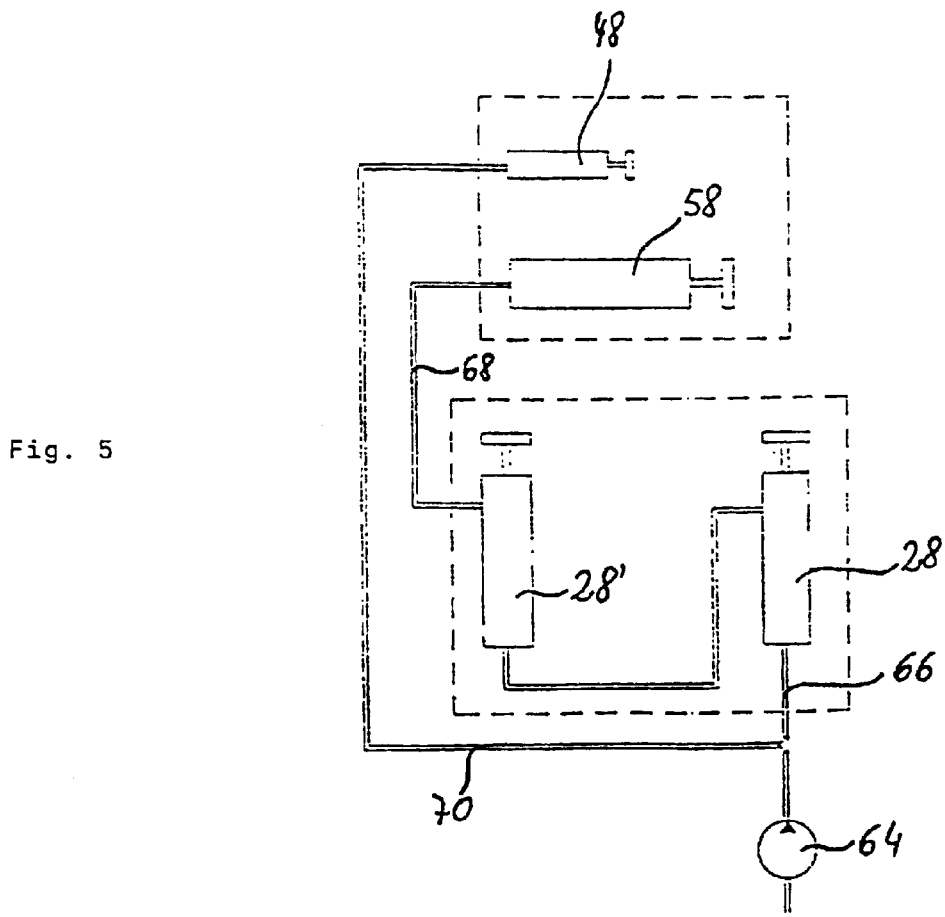
FIG. 5 is a circuit diagram showing the hydraulics for the chassis measuring apparatus illustrated in FIG. 1.

FIG. 5 shows the hydraulic circuit diagram for the chassis measuring apparatus according to the invention. As can be seen from FIG. 5 the piston-cylinder unit 28 of the vehicle lift platform 20, which in this case is formed from two piston-cylinder units 28 and 28', is connected by way of a line 66 to a source 64 for a pressure fluid. The outlet of the second piston-cylinder unit 28' of the vehicle lift platform 20 is connected by way of a further line 68 to the inlet of the piston-cylinder unit 58 of the second lifting stage 50 of the axle measurement lifting device 30. The piston-cylinder unit 48 of the first lifting stage 40 of the axle measurement lifting device 30 is connected to the source 64 of the pressure fluid by way of a line 70 which is separate from the piston-cylinder unit 28 and 28'of the vehicle lift platform 20 and the piston-cylinder unit 58 of the second lifting stage 50 of the axle measurement lifting device 30. In that way, the piston-cylinder unit 48 of the first lifting stage 40 can be actuated independently of actuation of the piston-cylinder units 28, 28', 58 of the vehicle lift platform 20 and the second lifting stage 50.

A measurement procedure using the apparatus according to the invention is carried out as follows, in accordance with the method of the invention:

A vehicle which is to be measured, in particular for example a private automobile, is driven on to the vehicle lift platform 20 as shown in FIG. 4 from the right-hand side thereof, with the vehicle lift platform 20 in a lowered condition. In conformity with the design configuration of the optical axle measuring unit 60, reflectors are fitted to the wheels of the vehicle to be examined. Then, the axle measuring unit 60 is extended out of the recess F1 by means of the first lifting stage 40 and adjusted in respect of vertical height in such a way that the measuring operation can be precisely carried out. If no faults are found on the vehicle, the first lifting stage 40 of the axle measurement lifting device 30 with the axle measuring unit 60 is moved back again into the recess F1 in the foundation F. The vehicle can then be driven off the vehicle lift platform 20 over the cover plate 62.

If however a fault is detected, then the vehicle lift platform 20 and at the same time the second lifting stage 50 of the axle measurement lifting device 30 are raised. The height is determined essentially such that an operator can move into a position under the vehicle to set the axles or wheels. As the vehicle lift platform 20 and the second lifting stage 50 of the axle measurement lifting device 30 are synchronously raised to the same height, the axle measuring unit 60 does not have to be freshly adjusted by means of the first lifting stage 40. After the desired height is reached by the vehicle lift platform 20 and the second lifting stage 40, the operator carries out the setting operation, in which case at the same time he can detect and establish the effects of his adjustment operations, by way of the values which are measured by the axle measuring unit 60.

When the setting operation is concluded, the vehicle lift platform 20 together with the second lifting stage 50 of the axle measurement lifting device 30 is lowered, with the second lifting stage 50 moving back into the recess F1 in the foundation F. At the same time or at a short time thereafter, the first lifting stage 40 also moves into the recess F1 in the foundation F. The vehicle can then be driven off the vehicle lift platform 20 again over the axle measurement lifting device 30.

It is to be noted that the method aspect of the invention can also be implemented independently of the above-described apparatus, in regard to the design configuration of an axle measurement lifting device with two lifting stages.

It will be appreciated that the above-described method and apparatus have been set forth solely by way of example and illustration and that modifications and alterations may be made therein without departing from the scope of the invention.

What is claimed is:

1. A chassis measuring apparatus for a vehicle, including
    a vehicle lift platform for reversibly lifting a vehicle to be measured,
    a lifting drive for the vehicle lift platform,
    an axle measuring unit for measuring parameters of an axle of the vehicle,
    an axle measurement lifting device adjacent an end of the vehicle lift platform, the axle measurement lifting device for reversibly lifting the axle measuring unit, the axle measurement lifting device comprising at least first and second lifting stages,
    means for actuating the lifting stages reversibly independently of each other,
    a lifting drive for the second lifting stage of the axle measurement lifting device, and
    means for a synchronous displacement of the lifting drive for the vehicle lift platform and of the lifting drive for the second lifting stage of the axle measurement lifting device.

2. A chassis measuring apparatus as set forth in claim 1 wherein the axle measurement unit is arranged on the first lifting stage.

3. A chassis measuring apparatus as set forth in claim 1 including
    a lifting drive for the first lifting stage of the axle measurement lifting device, and
    means for reversibly actuating the lifting drive for the first lifting stage independently of the drives of the second lifting stage and the vehicle lift platform.

4. A chassis measuring apparatus as set forth in claim 3 wherein the drive of the first lifting stage of the axle measurement lifting device comprises at least one piston-cylinder unit.

5. A chassis measuring apparatus as set forth in claim 1 wherein the drives of the vehicle lift platform and at least the second lifting stage of the axle measurement lifting device each comprise at least one respective piston-cylinder unit.

6. A chassis measuring apparatus as set forth in claim 5 including
means connecting the piston-cylinder unit of the vehicle lift platform in series with the piston-cylinder unit of the second lifting stage of the axle measurement lifting device for synchronous lifting to the same heightwise level.

7. A chassis measuring apparatus as set forth in claim 1 wherein at least one of the vehicle lift platform and the first lifting stage and the second lifting stage of the axle measurement lifting device is in the form of a scissors platform.

8. A chassis measuring apparatus as set forth in claim 1 including
a common foundation for supporting the vehicle lift platform and the axle measurement lifting device, the foundation having at least one recess for the axle measurement lifting device into which the axle measurement lifting device is lowerable in an inoperative condition thereof so that it aligns at least with the upper level of a trackway of the vehicle lift platform in its lowered condition.

9. A chassis measuring apparatus as set forth in claim 8 wherein the top of the axle measurement lifting device is provided with a plate adapted to at least approximately close off the recess in the foundation.

10. A method of chassis measurement of a vehicle with a chassis measuring apparatus which comprises a vehicle lift platform with which a vehicle to be measured can be reversibly lifted and an axle measurement lifting device adjacent an end of the vehicle lift platform, wherein the axle measurement lifting device is operable to reversibly lift an axle measuring device, the method comprising:
carrying out a measuring operation after the vehicle to be measured has been driven on to the vehicle lift platform and after aligning an axle measuring unit of the axle measurement lifting device with a portion of the vehicle by vertically displacing the axle measurement lifting device by a first lifting stage,
lifting the vehicle with the vehicle lift platform when a necessary chassis adjustment is detected by the measuring operation, and
when the vehicle lift platform is raised, following the movement of the vehicle lift platform with the axle measuring unit by means of a second lifting stage, wherein the second lifting stage of the axle measurement lifting device is raised synchronously with the vehicle lift platform.

11. A method as set forth in claim 10 wherein a drive of the first and the second lifting stages of the axle measurement lifting device and the drive of the vehicle lift platform are supplied from the same energy source.

12. A method as set forth in claim 10 wherein the axle measurement lifting device can be lowered in an inoperative condition thereof into a recess in a foundation of the chassis measuring apparatus in such a way that the upper end of the axle measurement lifting device is at least substantially aligned with the support surface for the vehicle to be measured when the vehicle lift platform is lowered.

13. A vehicle chassis measuring apparatus comprising:
a vehicle lift platform,
an axle measuring unit,
an assembly to synchronously lift the vehicle lift platform and the axle measuring unit,
an axle measurement unit lifting device for reversibly lifting the axle measuring unit, the axle measurement unit lifting device comprising at least first and second lifting stages, and means for actuating the at least first and second lifting stages reversibly and independently of each other.

14. The apparatus of claim 13, wherein the axle measurement unit lifting device comprises a lifting drive for the first lifting stage of the axle measurement lifting device.

15. The apparatus of claim 13, wherein the assembly comprises a lifting drive for the vehicle lift platform and a lifting drive for the second lifting stage of the axle measurement lifting device.

16. A method of chassis measurement of a vehicle, the method comprising:
positioning a vehicle on a vehicle lift platform;
adjusting a chassis measuring unit to measure a portion of a vehicle chassis;
detecting a necessary chassis adjustment by the measuring and, in response,
raising the vehicle lift platform and synchronously raising the chassis measuring unit.

* * * * *